United States Patent [19]
Ishii et al.

[11] Patent Number: 6,098,482
[45] Date of Patent: Aug. 8, 2000

[54] AUTOMATIC TRANSMISSION

[75] Inventors: Shigeru Ishii, Atsugi; Kouichi Hayasaki, Ebina, both of Japan

[73] Assignee: Nissan Motor Co., Ltd., Kanagawa, Japan

[21] Appl. No.: 09/168,957

[22] Filed: Oct. 9, 1998

[30] Foreign Application Priority Data

Oct. 9, 1997 [JP] Japan ................................. 9-277010

[51] Int. Cl.[7] ........................... B60K 17/10; F16H 61/26
[52] U.S. Cl. ...................... 74/473.11; 200/88; 477/130
[58] Field of Search ..................... 74/473.11; 200/88, 200/91; 477/127, 130

[56] References Cited

U.S. PATENT DOCUMENTS

| | | |
|---|---|---|
| 3,423,549 | 1/1969 | Sondei . |
| 3,435,713 | 4/1969 | Pfisterer et al. . |
| 3,785,614 | 1/1974 | Enomoto ..................... 74/473.11 X |
| 4,603,240 | 7/1986 | Hayasaki . |
| 5,085,102 | 2/1992 | Iwase et al. ..................... 74/473.11 X |
| 5,231,254 | 7/1993 | Baker et al. ........................ 200/88 X |
| 5,556,356 | 9/1996 | Hakamada et al. ................ 477/130 X |

OTHER PUBLICATIONS

"Full Range Electronic Transmission RE4R01A Maintenance Guidelines (A261C07)" by Nissan Motor Co., Ltd., Mar. 1987.

*Primary Examiner*—Thomas R. Hannon
*Assistant Examiner*—Colby Hansen
*Attorney, Agent, or Firm*—McDermott, Will & Emery

[57] ABSTRACT

An oil pressure supply path to a transmission is changed over using a spool valve comprising a spool which displaces in conjunction with a selector lever of the transmission. The displacement of the spool is detected by an inhibitor switch. By supporting the inhibitor switch directly by the spool valve, the spool displacement position and inhibitor switch output signal always precisely correspond. Therefore, it is unnecessary to adjust the relative position of the spool valve and inhibitor switch unlike the case where these members are supported separately in the transmission.

5 Claims, 4 Drawing Sheets

AUTOMATIC TRANSMISSION

FIELD OF THE INVENTION

This invention relates to a spool valve and an inhibitor switch with which an automatic transmission of a vehicle is provided.

BACKGROUND OF THE INVENTION

An automatic transmission for a vehicle changes a speed ratio according to running conditions by operating a planetary gear mechanism with an electronically controlled oil pressure system as disclosed in "Full Range Electronic Transmission RE4R01A Maintenance Guidelines (A261C07)" published by NISSAN Motor Co., Ltd. in March, 1987.

To accomplish this purpose, the oil pressure system comprises an oil pressure pump, valves which respond to electronic signals, and an accumulator.

A selector lever is provided to enable the driver to select various speed change modes, i.e. parking (P), reverse (R), neutral (N), drive (D), second speed (2), and first speed (1), etc. The selector lever is mechanically connected to a spool valve which forms part of the above-mentioned oil pressure system.

The spool valve selectively supplies a line pressure to predetermined parts of the automatic transmission from the oil pressure pump according to a spool displacement.

At the same time, a signal indicating the speed change mode is input to the electronic controller which controls the oil pressure system so that speed change control is performed according to the selected speed change mode.

This signal is output by an inhibitor switch in synchronism with the spool displacement of the spool valve.

According to the above-mentioned prior art the valves which constitute the oil pressure system are housed in a valve case installed under a transmission case which accommodates a planetary gear mechanism.

The inhibitor switch is supported by the transmission case, and is linked to the spool by a lever.

Therefore, when the automatic transmission is assembled, the relative position of the inhibitor switch and spool valve must be precisely adjusted so that the spool position of the spool valve in the valve case and the spool position signal output by the inhibitor switch supported by the transmission case precisely correspond.

SUMMARY OF THE INVENTION

It is therefore an object of this invention to provide a combination of an inhibitor switch and a spool valve wherein coincidence of a spool position and an inhibitor switch output signal is assured.

In order to achieve the above object, this invention provides an automatic transmission comprising a speed change unit (gear mechanism) controlled by oil pressure, a shift lever for selecting a speed change mode, a spool valve for changing an oil pressure supply path to the speed change unit according to a displacement of a spool in conjunction with the operation of the shift lever, and an inhibitor switch which is fixed and supported by a casing of to the spool valve for detecting the spool displacement.

It is preferable that the automatic transmission further comprises another valve, the spool valve comprises a first casing for housing the spool, and the other valve is housed in another casing which is formed independently from the first casing.

It is also preferable that the transmission further comprises a member for adjusting a relative position of the inhibitor switch and the spool valve.

The adjusting member may comprise, for example, a bolt and a bracket in which a long hole is formed through which the bolt passes.

It is also preferable that the spool valve comprises a casing for housing the spool, and the inhibitor switch is fixed to this casing.

The details as well as other features and advantages of this invention are set forth in the remainder of the specification and are shown in the accompanying drawings.

DESCRIPTION OF THE PREFERRED EMBODIMENTS

Figure 1:
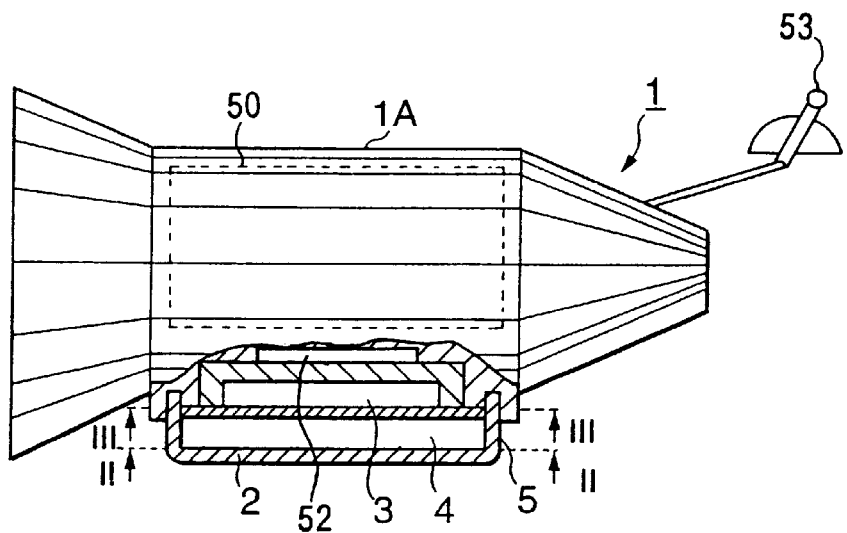
FIG. 1 is a side view including a partial sectional view of an automatic transmission according to this invention.

Referring to FIG. 1 of the drawings, a valve device 2 of an automatic transmission 1 comprises an upper part 3 and lower part 4 which are installed under a case 1A of a planetary gear mechanism 50. The planetary gear mechanism 50 is also referred to as a gear mechanism unit. The lower end of the lower part 4 is covered by an oil pan 5.

The automatic transmission 1 is mounted on a vehicle so that the input shaft and output shaft of the automatic transmission 1 are parallel to the longitudinal axis of the vehicle, and so that the left-hand edge in the figure is oriented toward the front of the vehicle and the right-hand edge of the figure is oriented toward the rear of the vehicle.

Figure 2:
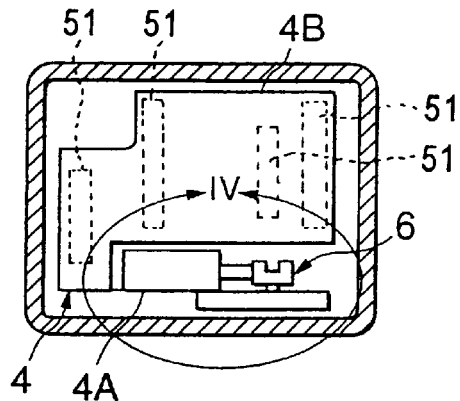
FIG. 2 is a sectional view through a valve device taken along a line II—II of FIG. 1.

Referring to FIG. 2, a spool valve 6 which operates according to a speed change mode is housed in the lower part 4. A casing 4A of the spool valve 6 is independent of a casing 4B of other valves 51. The casing 4A is also referred to as a first casing and the casing 4B is also referred to as a second casing. The spool valve 6 is arranged parallel to a rotation axis of the automatic transmission 1.

Figure 3:
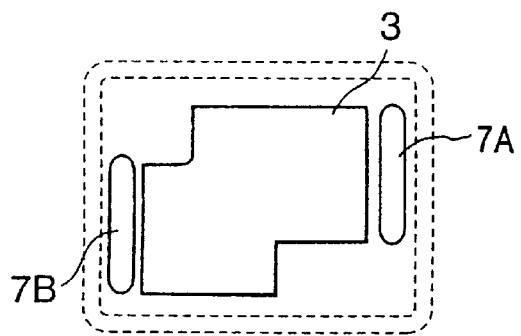
FIG. 3 is a a sectional view through the valve device taken along a line III—III of FIG. 1.

Referring to FIG. 3, oil passages 7A, 7B for transmitting hydraulic pressure between the lower part 4 and the case 1A of the planetary gear mechanism 50 are formed in the case 1A at a part surrounding the upper part 3.

Figure 4:
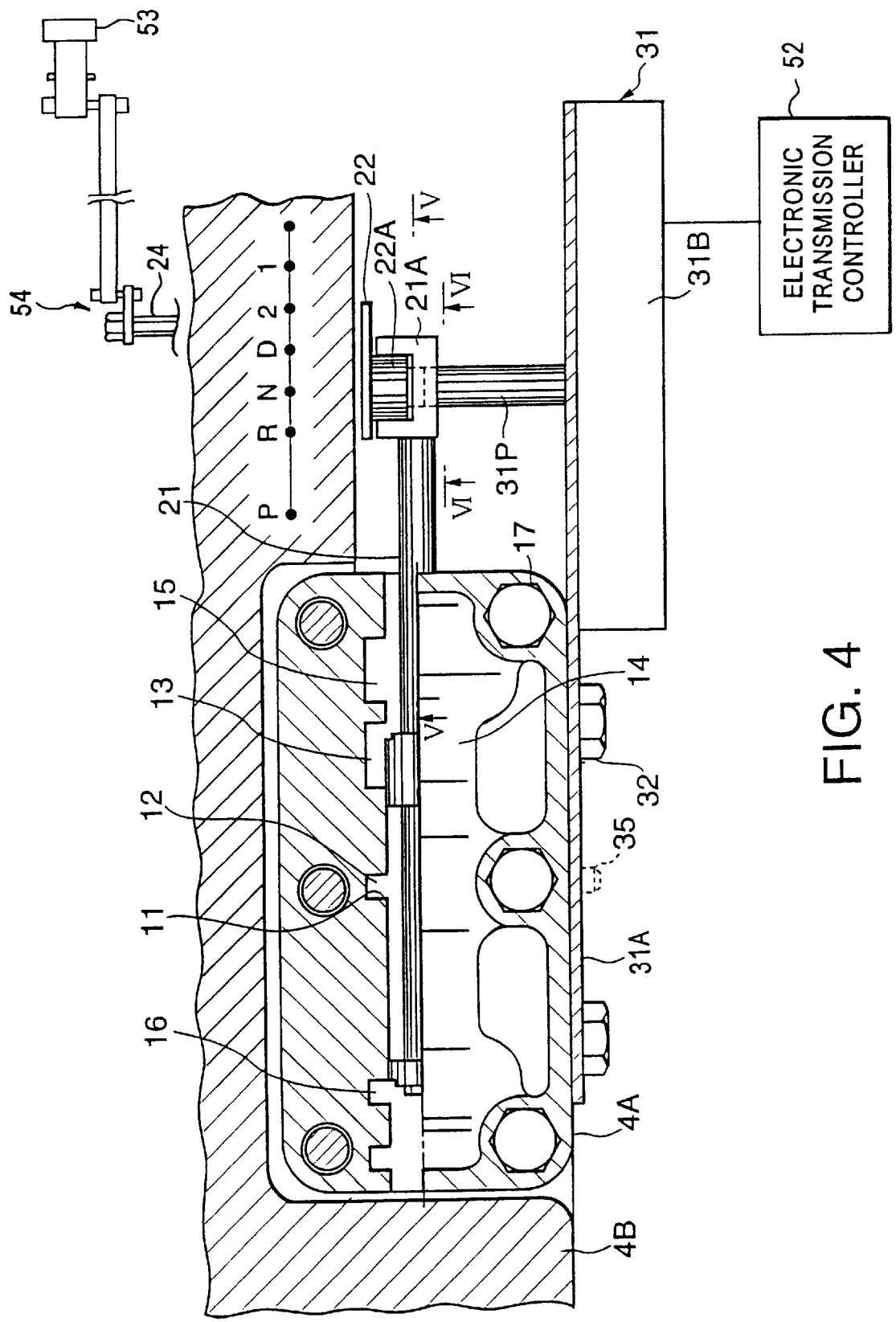
FIG. 4 is an enlarged longitudinal sectional view of a spool valve according to this invention, corresponding to a part IV in FIG. 2.

Referring to FIG. 4, the spool valve 6 comprises a spool 21 inserted in the casing 4A. A tip of a spool 21 extends from the casing 4A toward the rear of the vehicle. This extending direction of the spool 21 is the opposite of that of the spool valve disclosed in the above-mentioned prior art. The spool valve 6 has a port 12 of which a wall 11 functions as a reference point for the displacement of the spool 21. The positions where other ports 13, 14, 15 and 16 are formed are determined based on this wall 11. The casing 4A is fixed to the upper part 3 by plural bolts 17.

The oil pressure circuit is connected to the spool valve 6 in the same way as in the aforesaid prior art example. The tip of the spool 21 projecting from the casing 4A is connected to an inhibitor switch 31 via a pin 31P.

A holder 21A having a U-shaped groove is fixed to the tip of the spool 21. A circular part 22A forming a part of a plate 22 engages with the inside of this U-shaped groove.

Figure 6:
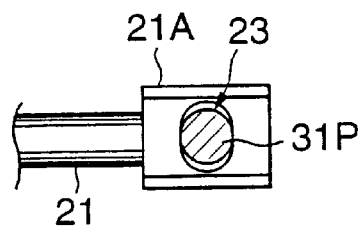
FIG. 6 is a sectional view of a holder and a shaft taken along the line VI—VI of FIG. 4.

A long hole 23 shown in FIG. 6 is formed in a part corresponding to the base of the U-shaped groove of the holder 21A.

The pin 31P which projects from the inhibitor switch 31 is inserted in the long hole 23.

The circular part 22A can rotate relative to the holder 21A. The pin 31P can displace with the axial displacement of the spool 21 and the inhibitor switch 31 detects the speed change modes from the position of the pin 31P. The pin 31 can also displace in the up/down direction within a small range that the long hole 23 allows.

Figure 5:
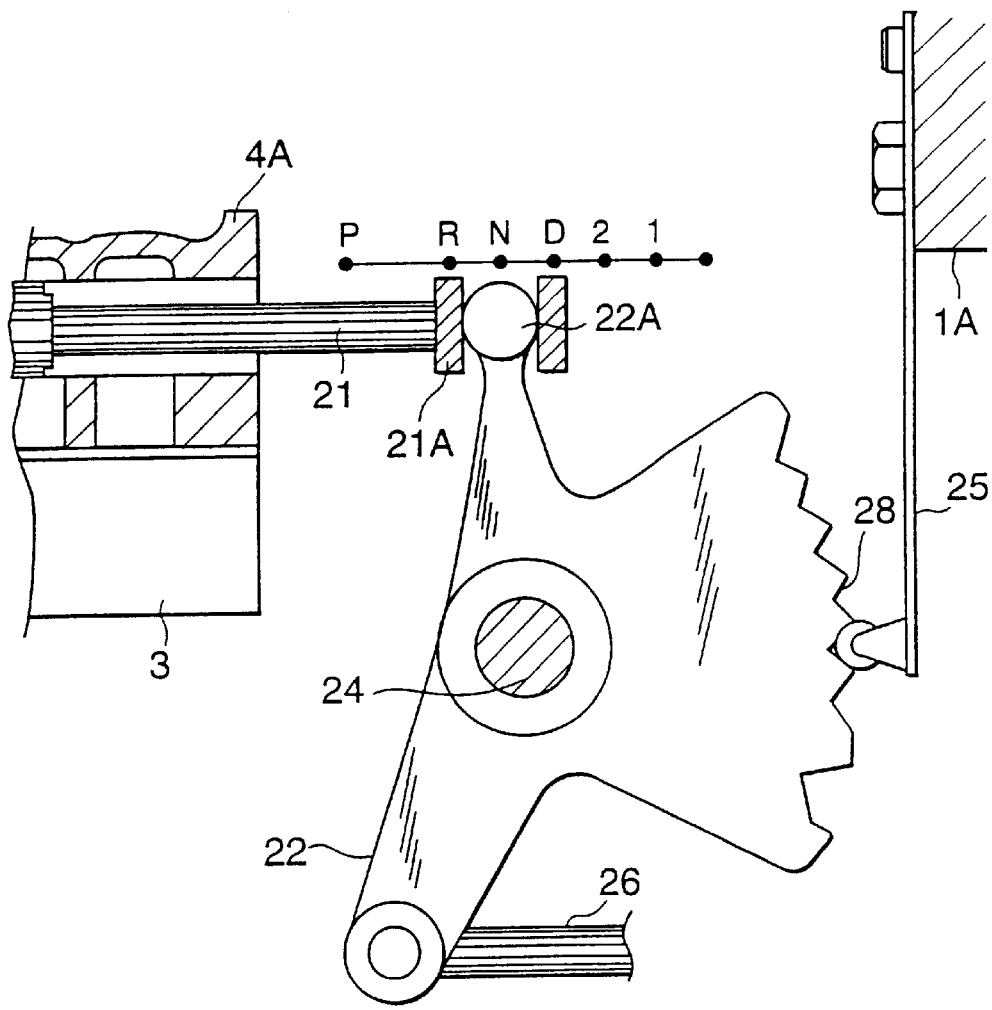
FIG. 5 is a sectional view of essential parts of the spool valve including a view of a plate and a selector lever, taken along a line V—V of FIG. 4.

FIG. 5 shows the state of the plate 22 in a neutral position N.

The plate 22 is fixed to a rotation shaft 24. The rotation shaft 24 is supported by the aforesaid case 1A of the planetary gear mechanism 50 so as to be free to rotate. The rotation shaft 24 is rotated together with the plate 22 by operation of a selector lever 53 by a driver of the vehicle.

Plural grooves 28 which engage with a detent member 25 supported by the case 1A are formed on the opposite side of the plate 22 to the spool 21 shown in FIG. 5.

The upper end of the plate 22 is connected to the output shaft of the automatic transmission 1 via a parking rod 26 in order to lock it when the plate 22 is rotated to a parking position. Since FIG. 5 is an inverted view with respect to the FIG. 1, the lower end of the plate 22 in FIG. 5 is actually the upper end of the same.

A bracket 31A which fixes a casing 31B of the inhibitor switch 31 is fixed to the casing 4A of the spool valve 6 by plural bolts 32, as shown in FIG. 4.

For this purpose, long holes (viz., elongate, non-circular openings) extending in the left-right direction of FIG. 4 is formed in the bracket 31A, and the bolts 32 pass through the long holes and are tightened to the casing 4A.

The inhibitor switch 31 makes contacts conducting corresponding to the speed change modes, i.e. parking (P), reverse (R), neutral (N), drive (D), second speed (2), and first speed (1), according to the rotation angle of the rotation shaft 24, and a signal is output from the contact that was made conducting to an electronic transmission controller, 52. The inhibitor switch 31 in this embodiment is a linear type, but a rotary type may also be used.

According to this embodiment, the relative positions of the spool 21 and inhibitor switch 31 are arranged so as to permit fine adjustment within the limits of the long holes formed in the bracket 31A.

Alternatively, the relative positions of the spool 21 and inhibitor switch 31 may be defined by extending a rocket pin 35 shown in FIG. 4 into the casing 4A, and passing the rocket pin 35 through a throughhole formed in the bracket 31A. In this case, fine adjustment of the relative position is impossible.

Such a construction is therefore made possible by first precisely controlling the dimensions of the parts forming the spool valve 6 and inhibitor switch 31.

Instead of using the bracket 31A, the inhibitor switch 31 may also be attached to a fixing part previously formed in a one-piece construction with the casing 4A.

When the selector lever is operated in the above construction, the plate 22 rotates with the rotation shaft 24, the spool 21 displaces axially, and line pressure is supplied to a different port.

As the spool 21 displaces, the pin 31P also displaced in the same direction. Due to this displacement of the pin 31P, the contact point of the inhibitor switch 31 changes over.

Figure 7:
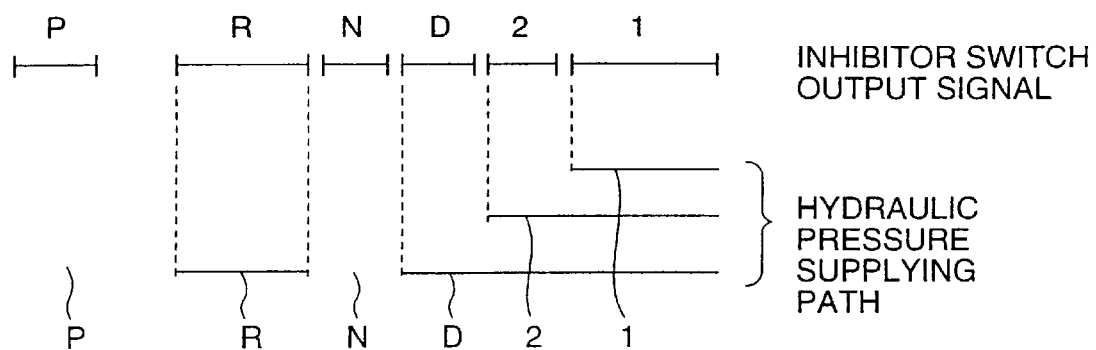
FIG. 7 is a diagram describing a relation between an oil pressure path of the spool valve and an inhibitor switch output signal according to this invention.

As a result, the output signal from the inhibitor switch 31 varies according to the oil pressure supply path of the spool valve 21, as shown in FIG. 7.

When the spool 21 displaces to a position corresponding to the parking (P) range, a parking gear, not shown, locks the output shaft of the automatic transmission 1 according to the stroke of the parking rod 26.

The spool valve 6 is assembled in the automatic transmission 1 by the following process.

First, the spool 21 in the spool valve 6 is displaced from the neutral (N) position shown in FIG. 5 to the parking (P) position.

The pin 31P projecting from the inhibitor switch 31 is then inserted into the long hole 23 of the holder 21A and the bracket 31A is fixed to the casing 4A by the bolts 32.

In this fixing step, the inhibitor switch 31 is set to correctly output a parking position signal by adjusting the installation position of the inhibitor switch 31 within the limits of the long holes into which the bolts 32 pass through.

In this way, the inhibitor switch 31 and spool valve 6 are pre-assembled as one unit.

The casing 4A of the spool valve 6 which is formed as a unit during the assembly of the automatic transmission 1 is then fixed to the upper part 3 by the bolts 17. When this unit is fixed to the upper part 3, the circular part 22A of the plate 22 is fitted in the U-shaped groove of the holder 21A.

Therefore, there is no need to adjust the relative positions of the inhibitor switch 31 and spool valve 6 when the automatic transmission 1 is assembled.

After thus assembling the spool valve 6 and inhibitor switch 31 in the automatic transmission 1, a link between the selector lever 53 and plate 22 is adjusted by an adjusting mechanism, 54, so that the selector lever correctly comes to the parking position.

As a result of this process, the operation of the parking gear, supply of oil pressure to a predetermined path for parking and the emission of a signal corresponding to the parking position output by the inhibitor switch 31, are performed in synchronism.

In this invention, as the inhibitor switch 31 was fixed to the casing 4A of the spool valve 6, it is possible to make the output of the speed change position signal of the inhibitor switch 31 precisely correspond to the position of the spool 21 before the casing 4A is fixed to the upper part 3.

Moreover, any installation errors when the casing 4A is installed in the upper part 3 do not affect this correspondence relation.

On the other hand, in the aforesaid prior art, the inhibitor switch is installed in the transmission case, and the spool valve is installed in a valve case corresponding to the upper part 3.

Dimensional errors in the transmission case, errors of the inhibitor switch or dimensional errors in the valve case have an effect on the relative position of the inhibitor switch and spool valve.

Therefore in the prior art, after the spool valve is fixed to the valve case and the inhibitor switch is fitted to the transmission case, an adjustment had to be performed to make the output signal from the inhibitor switch 31 precisely correspond with the displacement of the spool 21.

Errors which are introduced when fitting the inhibitor switch to the transmission also affect this adjustment operation.

According to this invention, this adjustment operation when the automatic transmission is assembled is unnecessary, so assembly of the spool valve 6 and inhibitor switch 31 in the automatic transmission 1 is much easier than in the case of the prior art transmission.

Moreover, as the casing 4A of the spool valve 6 is formed separately to the other valve casing 4B, the spool valve 6 and inhibitor switch 31 may be pre-assembled as an independent unit from the other valves 51. This also makes assembly of the automatic transmission 1 easy.

The embodiments of this invention in which an exclusive property or privilege is claimed are defined as follows:

What is claimed:

1. An automatic transmission comprising:

a gear mechanism controlled by oil pressure;

a spool valve which includes a first casing in which a spool is reciprocatively received, and which changes an oil pressure supply path to the gear mechanism according to a displacement of the spool in conjunction with the operation of a shift lever operatively connected to the spool of the spool valve, the first casing being fastened to a second casing which forms part of the transmission; and an inhibitor switch which detects the displacement of the spool, the inhibitor switch being fastened to the first casing so as to be supported thereon.

2. An automatic transmission as defined in claim 1, wherein the automatic transmission further comprises an adjusting member for adjusting a relative position of the inhibitor switch with respect to the first casing.

3. An automatic transmission as defined in claim 2, wherein said adjusting member comprises a bracket in which an elongate hole is formed and through which a bolt passes.

4. An automatic transmission as defined in claim 1, wherein the inhibitor switch is fixed to the first casing via a bracket which supports the inhibitor switch on the first casing in a predetermined positional relationship with respect to the first casing.

5. An automatic transmission comprising:

a gear mechanism controlled by oil pressure;

a spool valve which includes a first casing in which a spool is reciprocatively received, and which changes an oil pressure supply path to the gear mechanism according to a displacement of the spool in conjunction with the operation of a shift lever operatively connected to the spool of the spool valve, the first casing being fastened to a second casing which forms part of the transmission; and an inhibitor switch which detects the displacement of the spool, the inhibitor switch being fastened to the first casing so as to be supported thereon;

wherein the automatic transmission further comprises a second valve, which is housed in the second casing to which the first casing is adjustably fastened.

* * * * *